July 7, 1970

C. F. BUHRER ET AL 3,519,329

HIGH FREQUENCY LIGHT BEAM DEFLECTOR

Filed Sept. 23, 1968

INVENTORS.
CARL F. BUHRER
JOHN D. SCHLAFER

BY R. J. Frank
ATTORNEY.

Fig. 2a.    $\epsilon_1 = \epsilon_2$   $[k_{x1} \text{ real}]$

Fig. 2b.    $\epsilon_1 \gg \epsilon_2$   $[k_{x1} \text{ real}]$

Fig. 2c.    $\epsilon_2 \gg \epsilon_1$   $[k_{x1} \text{ imaginary}]$ $[k_{x1} = 0]$ $$\tan\left[\frac{2\pi L}{\lambda}\sqrt{\epsilon_2-\epsilon_1}\right] = -\frac{2\pi d}{\lambda}\sqrt{\epsilon_2-\epsilon_1}$$

INVENTORS.
CARL F. BUHRER
JOHN D. SCHLAFER

BY R. J. Frank
ATTORNEY.

July 7, 1970  C. F. BUHRER ET AL  3,519,329
HIGH FREQUENCY LIGHT BEAM DEFLECTOR
Filed Sept. 23, 1968  4 Sheets-Sheet 3

INVENTORS.
CARL F. BUHRER
JOHN D. SCHLAFER

BY R. J. Frank
ATTORNEY.

July 7, 1970  C. F. BUHRER ET AL  3,519,329
HIGH FREQUENCY LIGHT BEAM DEFLECTOR
Filed Sept. 23, 1968  4 Sheets-Sheet 4

INVENTORS.
CARL F. BUHRER
JOHN D. SCHLAFER

BY R. J. Frank
ATTORNEY.

3,519,329
HIGH FREQUENCY LIGHT BEAM DEFLECTOR
Carl F. Buhrer, Oyster Bay, and John D. Schlafer, Flushing, N.Y., assignors to General Telephone & E'ectronics Laboratories Incorporated, a corporation of Delaware
Filed Sept. 23, 1968, Ser. No. 761,695
Int. Cl. G02f *3/00, 1/26*
U.S. Cl. 350—150
10 Claims

ABSTRACT OF THE DISCLOSURE

Apparatus for electro-optically deflecting a light beam at a microwave frequency comprising an electro-optic member positioned within a microwave resonator cavity containing a dielectric filler material. A linearly varying electric field is established in the electro-optic member by choosing the parameters of the deflector such that the propagation constant of the electric field in the electro-optic member is essentially zero in all directions orthogonal in the direction of propagation of the light beam. The light wavefront passes through the electro-optic member free of any distortion which could result from the presence of a non-linearly varying electric field in the electro-optic member. In one embodiment of the invention, the electro-optic member is comprised of adjacently positioned electro-optic elements oriented in a manner which compensates for asychronism between the light velocity and the microwave phase velocity.

BACKGROUND OF THE INVENTION

This invention relates to beam deflectors and, in particular, to an apparatus for electro-optically deflecting a beam of electromagnetic energy, such as a light beam, at a microwave frequency. The apparatus is especially useful in display devices of the type wherein a well collimated light beam, as may be obtained for example from a laser light source, is spatially deflected at high frequencies. In such optical display applications, the rate of transmission of information displayed is a function of the number of distinct spots formed by the light beam per unit time. By deflecting the light beam at high frequencies it is possible to generate a large number of distinct spots and thereby obtain a high rate of information transmission. Thus it is desirable to have a system which is capable of deflecting a light beam at high frequencies, such as those in the microwave region of the spectrum.

Various methods have been used in the past to deflect a beam of light. For example, mechanical systems for spatially deflecting or scanning a light beam are well known. These systems, however, have been limited to relatively low frequencies due to the inertia associated with the movement of mechanical elements. Light beam deflectors employing electro-optic materials have been developed in which an electric signal is used to control light beam deflection. A typical system of this sort is disclosed in the copending United States application of Buhrer et al., Ser. No. 514,454, now U.S. Pat. No. 3,458,247, filed Dec. 17, 1965, and assigned to applicant's assignee. In this system a light beam is deflected by passage through a multi-element structure of electro-optic material. In systems such as Buhrer et al., however, the allowable frequencies of operation are generally limited to those below the microwave region (defined herein as the range 300 megahertz to 300,000 megahertz) since the deflector structures cannot support microwave energy. Accordingly, it is an object of this invention to provide a means of deflecting a light beam at a microwave frequency.

SUMMARY OF THE INVENTION

In accordance with the present invention there is provided a light beam deflector comprising a microwave resonator cavity proportioned to support wave energy in a TE mode. Microwave energy is introduced into the resonator by suitable coupling means and gives rise to a time-harmonic electric field transverse to the resonator ends. The resonator ends have entrance and exit apertures through which passes the beam of electromagnetic energy to be deflected. A member of electro-optic material is positioned in the resonator in alignment with the entrance and exit apertures. (An electro-optic material, as defined herein, is a material having at least one electrically-sensitive axis and at least one axis of polarization, the location of these axes depending upon the crystal structure of the material. The index of refraction along the axis of polarization of such a material can be varied by applying an electric field across the electrically-sensitive axis of the material.) The remainder of the resonator is filled with a material having a dielectric constant which is chosen so that, at the frequency of operation, the propagation constant of the electric field in the electro-optic member is essentially zero in all directions orthogonal to the direction of propagation of the beam of electromagnetic energy.

With such an arrangement, the magnitude of the electric field in the electro-optic material, as viewed in a plane parallel to the resonator ends, varies essentially linearly in a direction transverse to the direction of propagation of the beam of electromagnetic energy. This feature of the invention insures that the index of refraction of the member at any instant of time varies in an essentially linear manner across the beam wavefront, thereby preventing distortion of the wavefront. This is important since the uniformity of a beam's wavefront has a direct bearing on the resolution of a spot formed by the beam.

In an another embodiment of the invention, the member of electro-optic material is comprised of at least two elements of electro-optic material positioned such that the electrically-sensitive axis of each element is substantially parallel to the electrically sensitive axis of each other element. However, the individual elements are oriented in the structure such that the changes induced in the indices of refraction of adjacent elements are in opposite directions. By orienting the elements in this manner, the accumulation of beam deflection is accomplished notwithstanding electric field reversals during the light beam transit time.

These and other objects and advantages, the nature of the present invention, and its various features, will appear more fully upon consideration of the illustrative embodiments now to be described in detail in connection with the accompanying drawings.

DESCRIPTION OF THE PREFERRED EMBODIMENTS

Figure 1:
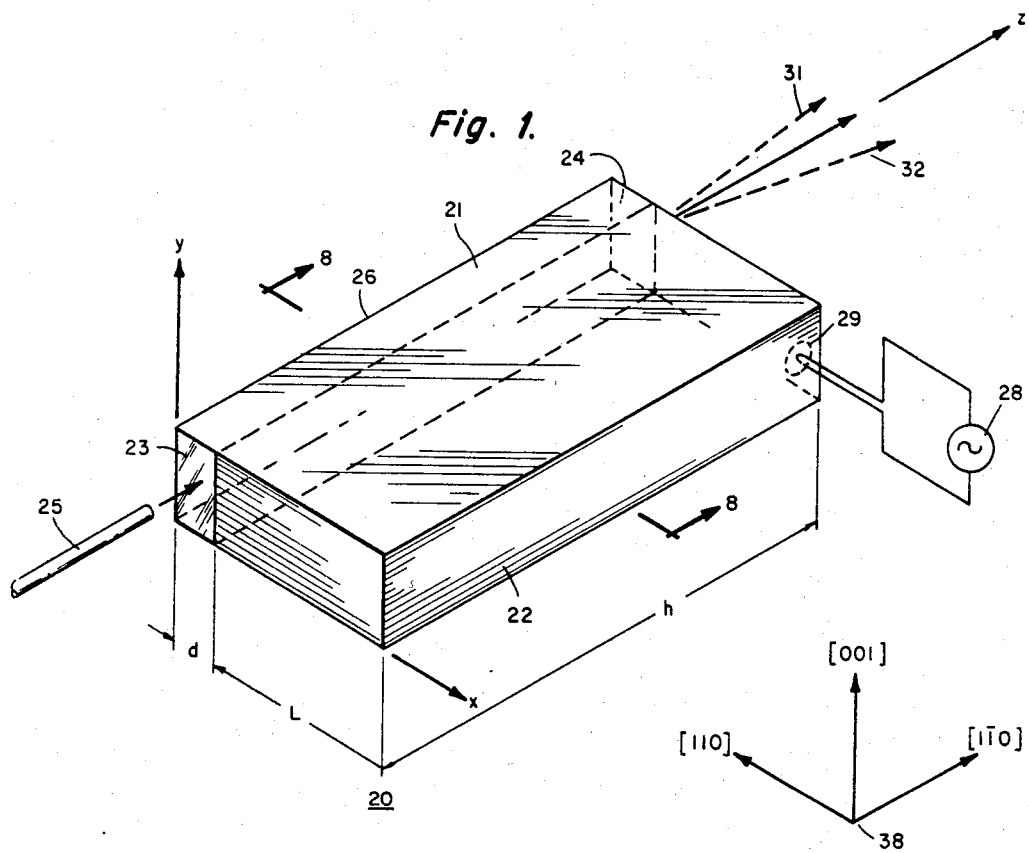
FIG. 1 is an illustrative embodiment of a deflector in accordance with the invention.

Referring now to FIG. 1 there is shown a rectangular microwave resonator cavity 20 having entrance and exit apertures 23 and 24. Within cavity 20 there is a member of electro-optic material 21 positioned in alignment with aperture 23 and 24. Member 21 is depicted as an elongated rectangular bar positioned contiguous to cavity sidewall 26 and oriented in the cavity 20 with its electrically-sensitive axis parallel to the y-direction. The remainder of cavity 20 is filled with electric material 22. Microwave energy is supplied to cavity 20 from a source 28 through coupling means 29 giving rise to a time harmonic electric field in cavity 20. Coupling means 29 is illustrated as a loop inserted in a slot in cavity 20, but may take other known forms. Source 25 is shown as directing a beam of electromagnetic energy, preferably a well collimated beam of plane polarized light, toward cavity 20.

The beam of light enters cavity 20 through entrance aperture 23, passes through electro-optic member 21, and emerges from the cavity through aperture 24. The beam is scanned back and forth in a manner as shown by dotted arrows 31 and 32 as a consequence of the electric field harmonic motion.

Figure 8:
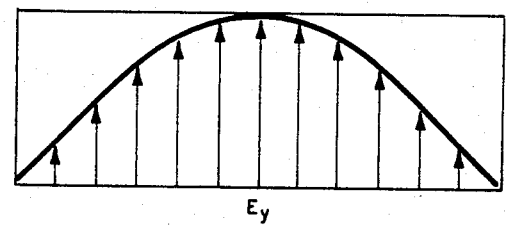
FIG. 8 is an explanator graph of an electric field in an empty cavity.

In the embodiment of FIG. 1, microwave resonator cavity 20 is proportioned to support wave energy in a $TE_{01q}$ mode, where $q$ represents the number of microwave half-wavelengths in the z-direction in cavity 20. In this embodiment, $q=2$ has been chosen for convenience of explanation. The electric field configuration for this mode, for the case in which cavity 20 is empty, would be as illustrated in FIG. 8 which is a cross sectional view of the cavity 20 as taken through a plane parallel to the resonator ends, such as one through section 8—8. The electric field is seen to have only a component in the y-direction, with the x and z components equal to zero. The field configuration shown in FIG. 8 is shown for an arbitrary value of z at a given instant of time. The field is time harmonic and will act as a standing wave, first reducing to zero and then building up again with reversed polarity, the speed of field reversal depending on the wave frequency.

For a cavity filled with two different materials, such as the embodiment of FIG. 1, the electric field configuration is a more complex function, which depends on, among other things, the dielectric constants of the materials contained within the cavity. For the embodiment of FIG. 1, the equations for the electric field in the cavity 20 can be solved using the basic wave potential equations for the cavity, the Maxwell equations for the transverse electric case, and the appropriate boundary conditions. The general method of solution is described in a book by R. F. Harrington entitled "Time Harmonic Electromagnetic Fields," McGraw-Hill, 1961. For the FIG. 1 configuration, it can be shown that the electric field in the electro-optic member, $Ey_1$, is given by $$Ey_1 = jk_zC \frac{\sin(k_{x2}L)}{\sin(k_{x1}d)} \sin(k_{x1}x) \exp(-jk_zz)$$

where $j$ is the imaginary operator $\sqrt{-1}$, $d$ is the width of the electro-optic member 21, L is the width of dielectric material 22, C is an amplitude constant which depends upon the magnitude of source 28, $k_z$ is the wave propagation constant in the z-direction, $k_{x1}$ is the wave propagation constant in the x-direction in the electro-optic member 21, and $k_{x2}$ is the wave propagation constant in the x-direction in the dielectric material 22. It should be noted that $k_z$ is the same for both materials (21 and 22) since the tangential components of the magnetic field at the boundary $x=d$ must be equal. It should be further noted that $k_y$ (the wave propagation constant in the y-direction) is zero since the wave does not propagate in the y-direction.

The behavior of the above expression for $Ey_1$ determines the deflection of the light beam to be scanned since the electrically sensitive axis of electro-optic member 21 is parallel to the y-direction. As will be seen below, it is imperative that $Ey_1$ varies in an essentially linear manner in the x-direction. This requirement of linearity is met by choosing $k_{x1}$ equal to zero. This can be demonstrated by letting $k_{x1}$ approach zero in the above expression for $Ey_1$ which yields $$Ey_1 = jk_zC \frac{x}{d} \sin(k_{x2}L) \exp(-jk_zz)(k_{x1} \rightarrow)0$$

Figure 2D:
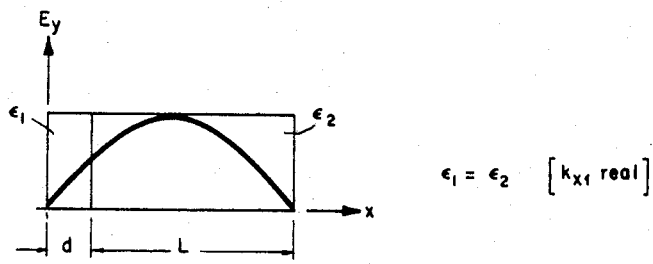
FIG. 2 is a graphical explanatory view of the electric fields in a cavity filled with two materials having different dielectric constants.
Figure 2D:
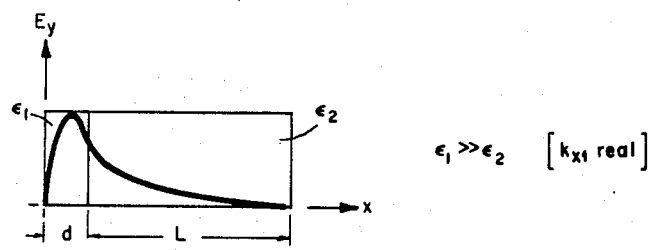
Figure 2D:
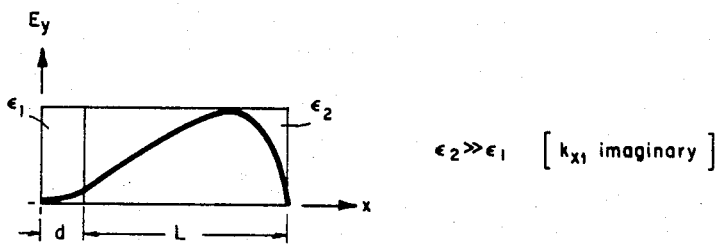
Figure 2D:
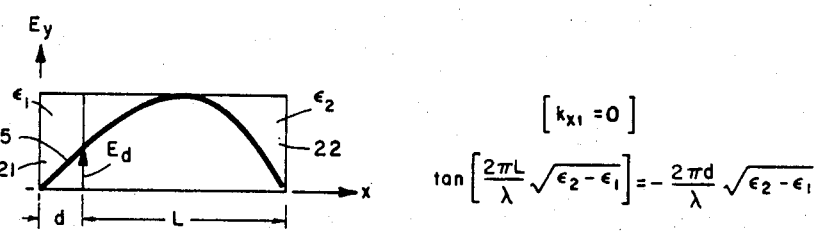

This expression is seen to vary linearly as a function of $x$ as desired. It can be shown that $k_{x1}$ will be equal to zero when the following relationship, which we shall call the "resonance" relationship, is met:

$$\tan\left[\frac{2\pi}{\lambda}\sqrt{\epsilon_2-\epsilon_1}L\right] = \frac{-2\pi d}{\lambda}\sqrt{\epsilon_2-\epsilon_1}$$

where $\epsilon_1$ is the dielectric constant of the electro-optic material 21, $\epsilon_2$ is the dielectric constant of the dielectric material 22, and $\lambda$ is the free space wavelength of the microwave energy. It will be helpful at this point to examine the behavior of the electric field in the cavity for different combinations of dielectrics $\epsilon_1$ and $\epsilon_2$. FIG. 2 shows the electric field in the cavity 20, as viewed through a cross section parallel to the ends of cavity 20, for different combinations of dielectrics $\epsilon_1$ and $\epsilon_2$. In each case it is assumed that the excitation energy source 28 is at the proper frequency to support waves in a $TE_{012}$ mode. In FIG. 2a, the dielectric constants are equal and the electric field takes on a symmetrical sinusoidal shape. FIG. 2b and FIG. 2c represent the electric fields for the cases in which one of the materials has a considerably higher dielectric constant than the other. In these configurations the majority of the wave energy is carried by the material of higher dielectric constant. Consequently, the strongest electric fields tend to crowd into the material of higher dielectric constant. In FIG. 2d, the resonance relationship is met with the resulting linearly varying electric field in the electro-optic member 21, as illustrated by the straight line segment 35.

FIG. 2 also indicates the nature of the propagation constant $k_{x1}$ for each of the four cases shown. In FIG. 2a and FIG. 2b, $k_{x1}$ is real, whereas in FIG. 2c, $k_{x1}$ is imaginary. In FIG. 2d, satisfaction of the resonance relationship assures that $k_{x1}$ is zero. By choosing the scanner parameters ($\epsilon_1$, $\epsilon_2$, L, d, $\lambda$) in accordance with the resonance relationship, the desired linear field is attained in electro-optic member 21.

There are many materials which exhibit electro-optic effects, but the tetragonal crystals, ammonium dihydrogen phosphate (ADP) and potassium dihydrogen phosphate (KDP) are particularly useful in that they exhibit a relatively large electro-optic effect. Accordingly, and for purposes of illustration, a member of KDP material is utilized in the embodiment of FIG. 1. For KDP, the [001]

crystallographic axis is the electrically-sensitive axis, which, as indicated by directional axes 38, is oriented in the y-direction. The [110] and [1$\bar{1}$0] crystallographic axes are oriented in the x and z directions, respectively. The light to be deflected is directed for travel along the [1$\bar{1}$0] axis and should be polarized along the [110] axis of member 21. If the light is polarized at an angle to the [110] axis, only the component of the light polarized along the [110] axis will be deflected.

In the embodiment of FIG. 1, the electric field in member 21, $Ey_1$, varies linearly along the [110] axis. This field produces a linear variation in the refractive index of member 21 in the [110] or x direction. Consider, now, a plane-wavefront of light as it passes through member 21 in the [1$\bar{1}$0] or z direction and experiences an electric field, $Ey_1$, such as that depicted in FIG. 2d. The portion of the wavefront at x equals zero will pass through material having an index of refraction, denoted $\eta_o$, characteristic of crystal member 21 undisturbed by an electric field. This portion of the wavefront will propagate with a velocity $V_o$, equal to the velocity of light in a vacuum divided by $\eta_o$. The portion of the wavefront at x equals d, however, will pass through material having an index of refraction, $\eta_d$, characteristic of crystal member 21 when acted upon by an electric field of magnitude $E_d$. This portion of the wavefront will travel with a velocity $V_d$, equal to the velocity of light in a vacuum divided by $\eta_d$. The velocity $V_d$ will be either greater or less than $V_o$ depending on the polarity of the electric field $E_d$. The remaining portions of the wavefront will propagate at velocities which vary essentially linearly between $V_o$ and $V_d$. As a result, the surfaces of constant phase will tend to tilt and the beam will be deflected toward the side of the wavefront propagating at a smaller velocity.

A well collimated beam of plane polarized light, such as that obtained from light source 25, can be used to form a spot having resolution limited by diffraction. This resolution would be degraded by any distortion of the beam wavefront, such as that which would occur if the electric field in electro-optic member 21 was not a linearly varying field. The importance of having a linearly varying field in the present invention can thus be readily appreciated.

Figure 3:
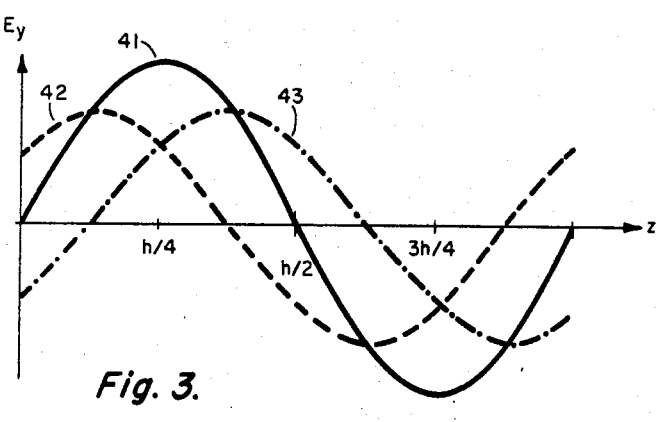
FIG. 3 is an explanatory graph showing an electric field as a function of cavity length.

A further understanding of the present invention is facilitated by utilizing a travelling wave analysis of the electric field in cavity 20 of FIG. 1. The electric field in cavity 20, is shown in FIG. 3 at some arbitrary time as a function of z. The solid line 41 represents the electric field in a cavity having a length, h, equal to two microwave half-wavelengths. This length has been chosen for convenience of explanation, and could well be any integral number of half-wavelengths. The electric field behaves as a standing wave having nodes at z equals zero and z equals h, a condition imposed on the electric field by the conductivity of the end walls of cavity 20. The electric field also has a node at h/2, and has peaks at h/4 and 3h/4. Standing wave 41 can be expressed as the sum of a forward travelling component, represented as dashed line 42, and a reflected component, represented as dotted line 43, travelling in opposite directions at the microwave phase velocity, $V_p$.

If we now consider a beam of light travelling through the electro-optic member 21 parallel to the z-direction, it can be shown to a good approximation that only the forward travelling component contributes to the total deflection of the beam. This phenomena can be conceptually accounted for by noting that the light beam and the reflected field component are travelling in opopsite directions, which tends to cause the cancellation of the deflection contributions of the reflected field component.

Figure 4A:
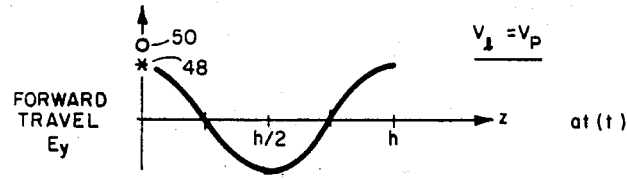
FIG. 4 is an explanatory graph showing an example of velocity synchronism between a light wavefront and an electric field component.
Figure 4B:
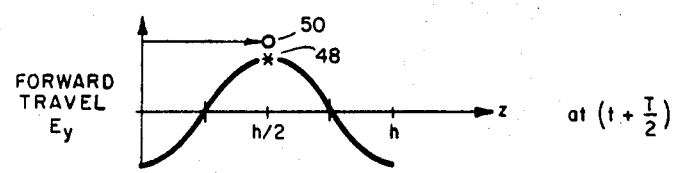
Figure 4C:
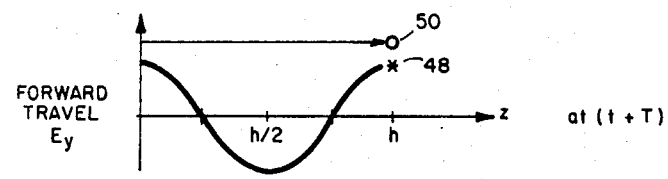
Figure 5A:
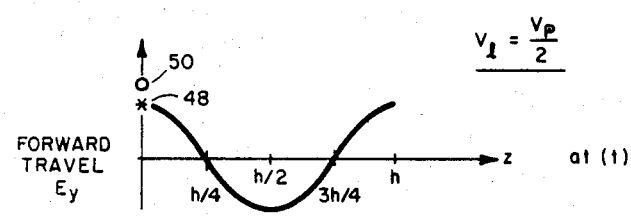
FIG. 5 is an explanatory graph similar to FIG. 4 for an example of velocity synchronism.
Figure 5B:
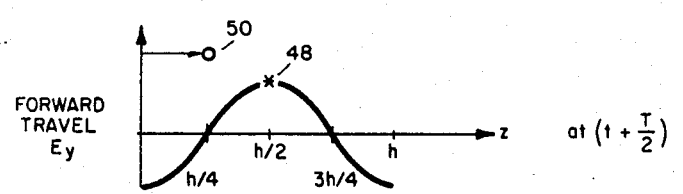
Figure 5C:
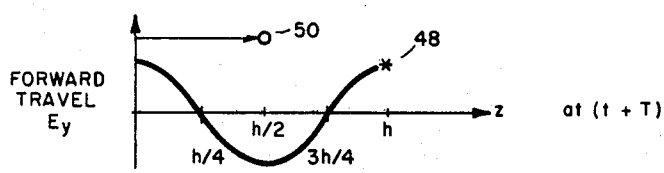
Figure 5D:
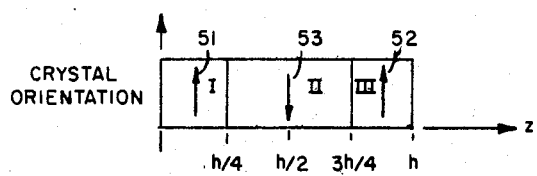

FIG. 4 shows the forward travelling wave component of the electric field at a time t and subsequent times $$\left(t+\frac{T}{2}\right)$$

and (t+T) shown in FIGS. 4a, 4b, and 4c respectively, as the wave progresses through one cycle of period T. The microwave phase velocity $V_p$ is defined as the velocity with which a given point on the electric field travelling wave advances through the cavity; i.e., for example, the velocity of the point represented by asterisks 48 in FIG. 4. The dot 50 represents a wavefront of light from light source 25 which enters electro-optic member 21 at time t and travels through member 21 at a velocity $V_L$, the velocity of light in the electro-optic material. When the microwave phase velocity $V_p$ is equal to the velocity of light in the electro-optic member $V_L$, the wavefront 50 travels through member 21 in synchronism with the forward travelling wave component of the electric field, always experiencing an electric field of the same polarity, as is the case in FIG. 4. In this condition, the deflection of the light beam accumulates as the light beam progresses through member 21.

FIG. 5 illustrates a case in which the deflection of the beam does not accumulate. In FIG. 5 the velocity of light in member 21 is set equal to one-half the microwave phase velocity. As before, the light wavefront 50 enters member 21 at a time t. During the transition between FIG. 5a and FIG. 5b (the first microwave half-period) the light wavefront 50 begins to lag behind the electric field it experienced at time t (asterisk 48), but still experiences an electric field of the same polarity as at time t. However, in the transition between FIG. 5b and FIG. 5c (the second microwave half-period), the light wavefront 50 experiences an electric field opposite in polarity to that experienced in the first microwave half-period. The change in polarity of the electric field makes the index of refraction of member 21 shift and cause deflection of the light beam in a direction opposite to that which had been occuring before the polarity change. As the wavefront 50 advances through the remaining half of member 21 (not shown), the electric field goes through a second complete cycle causing a deflection cancellation similar to that which occurred during the first cycle. Thus it is seen that asynchronism between $V_L$ and $V_p$ causes undesirable cancellations of deflection.

One method of overcoming the mismatch between $V_L$ and $V_p$ is to use an electro-optic member whose length is small in comparison to the microwave wavelength. For example, in FIG. 5, if the electro-optic member had a length h/4 rather than h, the light beam wavefront 50 would pass through the member before being affected by an electric field reversal. In the embodiment of FIG. 1, electro-optic membre 21 can be shortened to any desired length without changing the electric field structure in the cavity by replacing part of member 21 with a passive light-transparent material having a dielectric contant, $\epsilon_1$, which is the same as member 21. It should be noted, however, that shortening the electro-optic member decreases the maximum deflection available from the apparatus.

In another embodiment of the invention, member 21 is comprised of at least two elements of electro-optic material. The individual elements are oriented in the structure such that, for a given electric field applied across member 21, the changes in the indices of refraction of adjacent elements are in opposite directions. By orienting the elements in this manner, the accumulation of deflection is accomplished.

To illustrate the operation of this embodiment it is instructive to consider again the example of FIG. 5. The positions of the electro-optic elements for this example are as shown in FIG. 5d. Areas I, II and III represent three adjacent electro-optic elements. For a given electric field, elements I and III are oriented such that the change in their indices of refraction would cause light beam deflection in the same direction, as indicated by arrows 51 and 52. Element II is oriented such that the same electric field would light light beam deflection in a direction opposite to that occuring in elements I and III, as indicated by arrow 53. This effect can be accomplished by rotating the orientation of [001] and the

Figure 6:
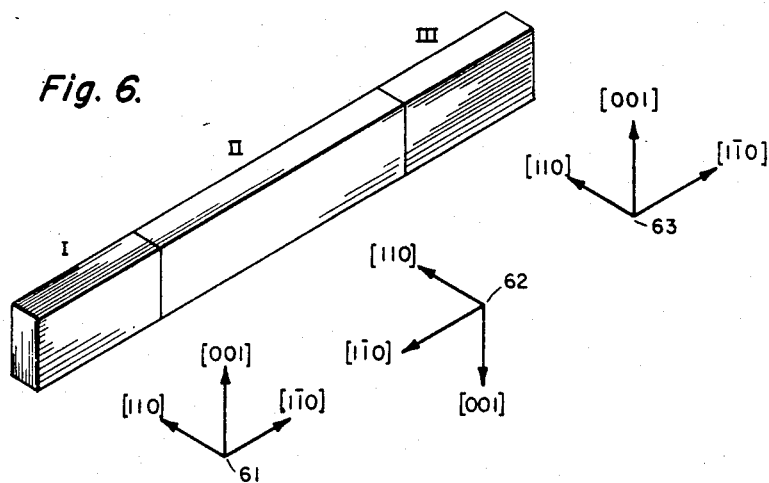
FIG. 6 is an explanatory diagram of the electro-optic element orientation for an example of one embodiment of the invention.

[1$\bar{1}$0] crystallographic axes of element II by 180° with respect to the [001] and [1$\bar{1}$0] axes of elements I and III, while keeping [110] axis of element II collinear with that of elements I and III. The orientations of the crystallographic axes for this example are as shown in FIG. 6, where the directional axes 61, 62 and 63 indicate the orientation of elements I, II, and III, respectively. Element II occupies a position which corresponds to the area during which wavefront 50 of FIG. 5 experiences an electric field of a polarity opposite to that experienced by wavefront 50 when it first entered the electro-optic member 21. With this arrangement, the deflection of the light beam will continue to accumulate in element II notwithstanding the reversal of electric field polarity, since the deflection direction is correspondingly reversed. For the example of FIG. 5, element II is seen to occupy the middle half of member 21, while elements I and III occupy the first and fourth quarters, respectively. In general, the positions and orientations of the electro-optic elements comprising member 21 will depend upon the ratio of $V_L$ to $V_p$. The adjacent element boundaries are determined by finding the points at which the electric field acting on a given wavefront reverses polarity, as was done in the example of FIG. 5.

Figure 7:
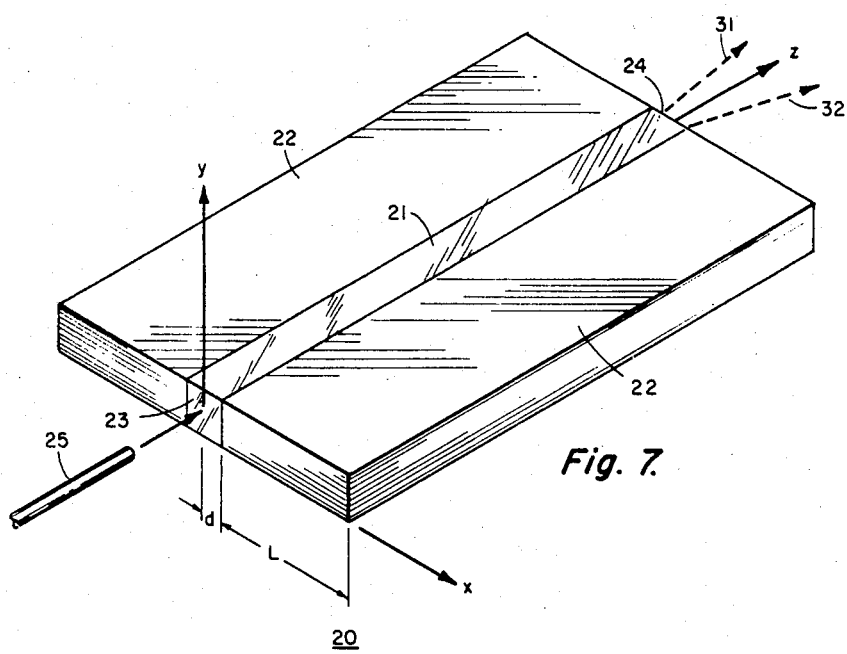
FIG. 7 is another illustrative embodiment of a deflector in accordance with the invention.

The embodiment of FIG. 1 employs a resonator cavity proportioned to wave energy in a $TE_{012}$ mode. Higher order modes can be used in a similar manner. For example, FIG. 7 shows an embodiment of the invention in which cavity 20 is proportioned to support wave energy in a $Te_{02q}$ mode. This embodiment can be pictured as two of the FIG. 1 cavities placed side by side. In this embodiment, the electro-optic member 21 is centrally positioned in the cavity 20 with dielectric material 22 filling the remainder of the cavity 20. The electric field $E_y$ on each side of the y-axis has the same form as the fields of the FIG. 1 embodiment. As in the FIG. 1 embodiment, $E_y$ is zero at y equals zero. When the resonance relationship is satisfied, the electric field varies substantially linearly in member 21, having maximum magnitude and opposite polarities at x equals d and x equals $-d$. This embodiment allows the use of an electro-optic member 21 which is twice as wide as the $TE_{01q}$ embodiment at the same microwave frequency.

Cavities which support TE modes having electric fields in both the x and y directions can also be used, but performance of such apparatus may be degraded by the effects of the electric field perpendicular to the electrically-sensitive axis of the electro-optic member. Further variations and modifications of the invention may be made all within the scope of the applied claims.

What is claimed is:
1. Apparatus for deflecting a beam of electromagnetic energy at a microwave frequency comprising:
   (a) a microwave resonator cavity, the dimensions of said cavity being proportioned to support microwave energy in a TE mode, said cavity having entrance and exit apertures at opposite ends to allow passage of said beam therethrough,
   (b) means for coupling microwave energy to said cavity at said microwave frequency,
   (c) a member of electro-optic material positioned in said cavity in alignment with said entrance and exit apertures, and
   (d) dielectric material filling the remainder of said cavity, said dielectric material having a dielectric constant chosen such that the propagation constant of the electric field in the electro-optic member is essentially zero in all directions orthogonal to the direction of propagation of said beam of electromagnetic energy.

2. The beam deflecting apparatus as defined by claim 1 wherein said member of electro-optic material comprises at least two electro-optical elements oriented so that electrically-induced changes in the indices of refraction of adjacent elements are in opposite directions.

3. The beam deflecting apparatus as defined by claim 1 wherein said cavity is proportioned to support microwave energy in a $TE_{01q}$ mode, where q is an integer equal to or greater than one, and said member of electro-optic material is oriented with its electrically-sensitive axis parallel to the direction of the electric field in said cavity.

4. The beam deflecting apparatus as defined by claim 1 wherein said cavity is proportioned to support microwave energy in a $TE_{02q}$ mode, where q is an integer equal to or greater than one, and said member of electro-optic material is centrally positioned in said cavity with its electrically-sensitive axis parallel to the direction of the electric field in said cavity.

5. The beam deflecting apparatus as defined by claim 3 wherein said cavity is rectangular in shape and said member of electro-optic material is positioned in said cavity contiguous to a sidewall thereof.

6. The beam deflecting apparatus as defined by claim 5 wherein said member of electro-optic material comprises at least two electro-optic elements oriented so that electrically-induced changes in the indices of refraction of adjacent elements are in opposite directions.

7. Apparatus for deflecting an optical beam at a microwave frequency comprising:
   (a) a microwave resonator cavity, the dimensions of said cavity being proportioned to support microwave energy in a TE mode, said cavity having entrance and exit apertures at opposite ends to allow passage of said optical beam therethrough,
   (b) means for coupling microwave energy to said cavity at said microwave frequency,
   (c) a member of electro-optic material positioned in said cavity in alignment with said entrance and exit apertures, and
   (d) dielectric material filling the remainder of said cavity, said dielectric material having a dielectric constant $\epsilon_d$ chosen in accordance with the relationship $$\tan\left[\frac{2\pi}{\lambda}(a-d)\sqrt{\epsilon_d-\epsilon_e}\right] = \frac{-2\pi d}{\lambda}\sqrt{\epsilon_d-\epsilon_e}$$

where:

$a$ is the width of the cavity ends,
$d$ is the width of the electro-optic member,
$\epsilon_e$ is the dielectric constant of the electro-optic material, and
$\lambda$ is the free space wavelength of the microwave energy.

8. The beam deflecting apparatus as defined by claim 7 wherein said member of electro-optic material comprises at least two electro-optic elements oriented so that electrically-induced changes in the indices of refraction of adjacent elements are in opposite directions.

9. Apparatus for deflecting a beam of plane polarized light at a microwave frequency comprising:
   (a) a microwave resonator cavity, the dimensions of said cavity proportioned to support microwave energy in a $TE_{01q}$ mode, where q is an integer equal to or greater than one, said cavity having entrance and exit apertures at opposite ends to allow passage of said light beam therethrough.
   (b) means for coupling microwave energy to said cavity at said microwave frequency,
   (c) a member of electro-optic material positioned in said cavity in alignment with said entrance and exit apertures, said member having mutually orthogonal [001], [110], and [1$\bar{1}$0] directions, said [001] direction being parallel to the direction of the electric field in said cavity, said [110] direction being parallel to the direction of polarization of said light beam, and said [1$\bar{1}$0] direction being parallel to the direction of propagation of said light beam, and
   (d) dielectric material filling the remainder of said cavity, said dielectric material having a dielectric constant chosen such that the propagation constant of the electric field in the electro-optic member is essentially zero in all directions orthogonal to the direction of propagation of said light beam.

10. The light beam deflecting apparatus as defined by claim 9 wherein said member of electro-optic material comprises at least two adjacently positioned electro-optic elements oriented such that the electrically-sensitive axis of each element is at an angle of 180° with respect to the electrically-sensitive axis of its adjacent elements.

References Cited

UNITED STATES PATENTS 3,431,418   3/1969   Stone.

DAVID SCHONBERG, Primary Examiner

P. R. MILLER, Assistant Examiner

U.S. Cl. X.R.

250—199; 350—160